US012096391B2

(12) United States Patent
Kolanowski et al.

(10) Patent No.: US 12,096,391 B2
(45) Date of Patent: Sep. 17, 2024

(54) SYSTEMS AND METHODS FOR CONTROLLING PROVISION OF FIXED WIRELESS SERVICES UTILIZING A LIST OF AUTHORIZED IDENTIFIERS

(71) Applicant: Verizon Patent and Licensing Inc., Basking Ridge, NJ (US)

(72) Inventors: Stephen J. Kolanowski, Keller, TX (US); Samirkumar Patel, Middlesex, NJ (US); Angel V. Gomez, Fort Worth, TX (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 17/444,508

(22) Filed: Aug. 5, 2021

(65) Prior Publication Data
US 2023/0045180 A1 Feb. 9, 2023

(51) Int. Cl.
*H04W 60/00* (2009.01)
*H04M 15/00* (2006.01)
*H04W 4/20* (2018.01)
*H04W 60/04* (2009.01)

(52) U.S. Cl.
CPC .......... *H04W 60/04* (2013.01); *H04M 15/66* (2013.01); *H04W 4/20* (2013.01)

(58) Field of Classification Search
CPC ........ H04W 60/04; H04W 4/20; H04M 15/66
See application file for complete search history.

(56) References Cited

U.S. PATENT DOCUMENTS

| 10,869,254 | B1* | 12/2020 | Huang | H04W 76/12 |
|---|---|---|---|---|
| 2005/0043012 | A1* | 2/2005 | Benco | H04M 15/8351 455/406 |
| 2011/0013569 | A1* | 1/2011 | Scherzer | H04W 48/20 707/769 |
| 2015/0111540 | A1* | 4/2015 | Chana | H04M 1/72457 455/411 |
| 2018/0352501 | A1* | 12/2018 | Zhang | H04W 48/18 |
| 2020/0015046 | A1* | 1/2020 | Wong | H04M 15/66 |
| 2020/0028973 | A1* | 1/2020 | Livanos | H04M 15/8214 |
| 2020/0396788 | A1* | 12/2020 | Tiwari | H04W 76/11 |

* cited by examiner

*Primary Examiner* — Pakee Fang

(57) ABSTRACT

A device may create a list of identifiers for base stations that support a fixed wireless service for a user device. The device may receive a first identifier of a first base station associated with a first attach request of the user device. The device may enable the fixed wireless service for the first base station for the user device when the first identifier is included in the list of identifiers. The device may disable the fixed wireless service for the first base station for the user device when the first identifier is not included in the list of identifiers.

20 Claims, 7 Drawing Sheets

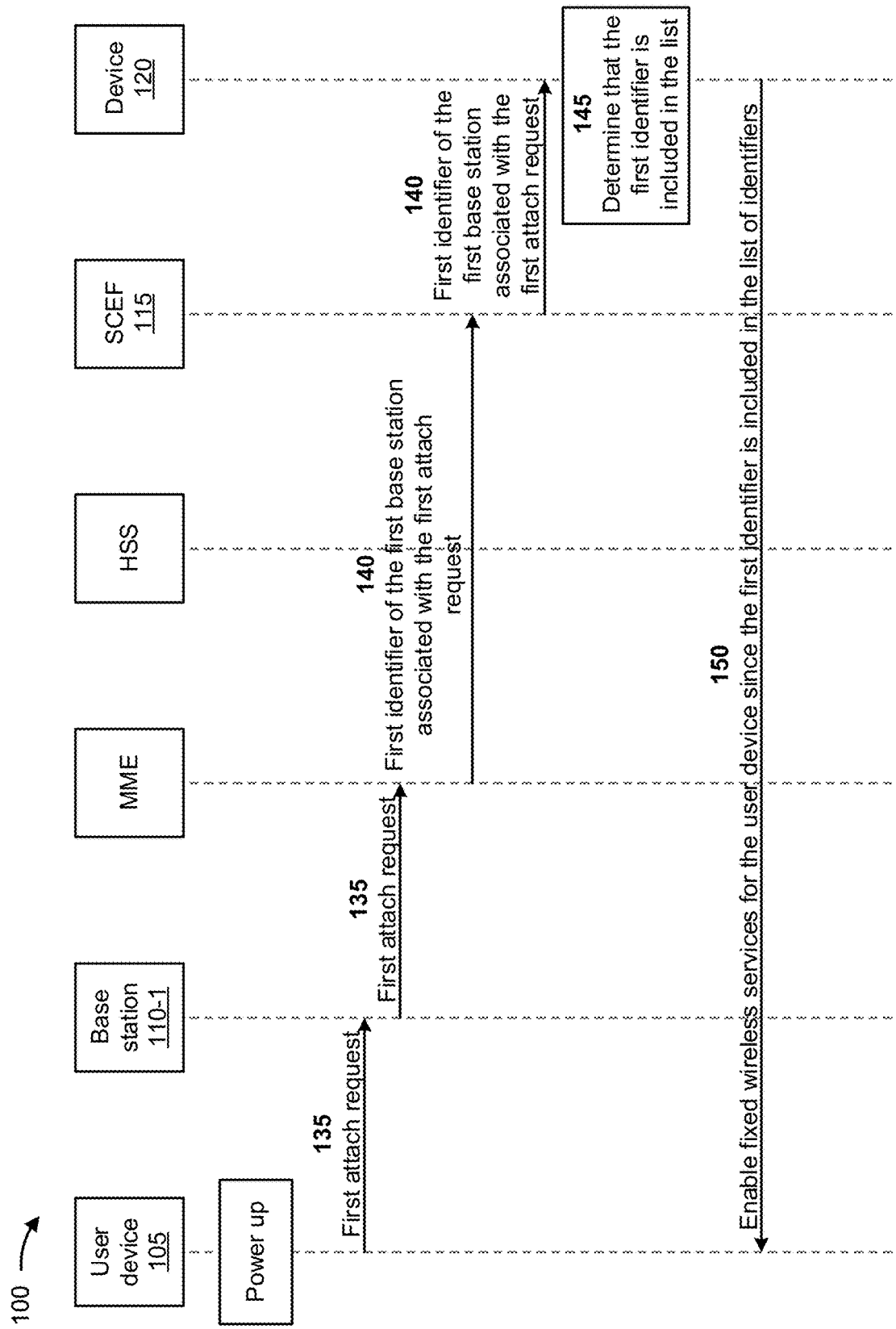

SYSTEMS AND METHODS FOR CONTROLLING PROVISION OF FIXED WIRELESS SERVICES UTILIZING A LIST OF AUTHORIZED IDENTIFIERS

BACKGROUND

A geofence is a virtual perimeter for a real-world geographic area. A geofence may be dynamically generated (e.g., a radius around a point location) or may be a predefined set of boundaries (e.g., school zones or neighborhood boundaries). The use of a geofence is called geofencing. An example of geofencing may include usage by a location-aware device of a service based on entering or exiting a geofence.

BRIEF DESCRIPTION OF THE DRAWINGS

FIGS. 1A-1D are diagrams of an example associated with providing network-based control of fixed wireless services.

DETAILED DESCRIPTION OF EXAMPLE EMBODIMENTS

Figure 1A:
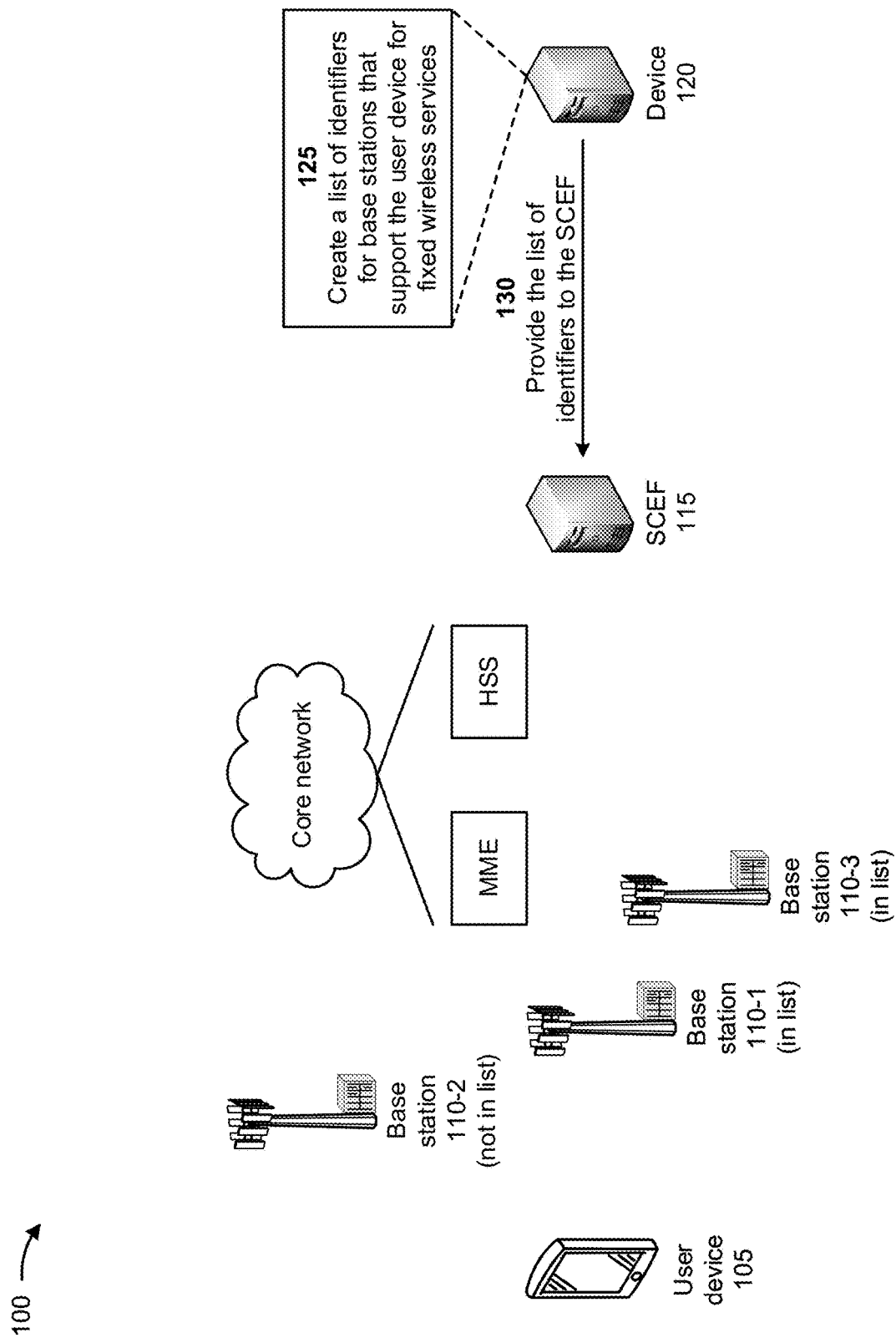

The following detailed description of example implementations refers to the accompanying drawings. The same reference numbers in different drawings may identify the same or similar elements.

Service providers may provide fixed wireless services (e.g., Internet services) for user devices in areas where cell sites have excess capacity. The fixed wireless services may be unlimited in these areas and may utilize the excess capacity. However, the service providers cannot control which cell sites the user devices utilize. Current geofencing techniques provide a list of cell identifiers (e.g., base station identifiers) to a user device. However, a user may transport the user device to a cell not included on the list and may utilize a fixed wireless service via a base station associated with the cell, which may overload the base station. Furthermore, it is difficult to manage and update the lists of cell identifiers pushed to the user devices. Without properly managed and updated lists of cell identifiers, user devices may move to and utilize (e.g., for fixed wireless services) base stations not allocated for fixed wireless services. The non-allocated base stations may become congested due to improper utilization of fixed wireless services via the non-allocated base stations. Thus, current geofencing techniques consume computing resources (e.g., processing resources, memory resources, communication resources, and/or the like), networking resources, and/or other resources associated with user devices inappropriately utilizing cell sites for fixed wireless services, handling network traffic slow down or stoppage caused by the user devices inappropriately utilizing cell sites, handling complaints associated with the network traffic slowdown or stoppage, and/or the like.

Some implementations described herein provide a device (e.g., a network device) that provides network-based control of fixed wireless services. For example, the device may create a list of identifiers for base stations that support a fixed wireless service for a particular user device. The device may receive a first identifier of a first base station associated with a first attach request of the user device. The device may enable the fixed wireless service for the first base station for the user device when the first identifier is included in the list of identifiers. The device may disable the fixed wireless service for the first base station for the user device when the first identifier is not included in the list of identifiers.

In this way, the device provides network-based control of fixed wireless services. For example, the device may identify base stations with excess capacity that are capable of serving a user device for fixed wireless services and may create a list of identifiers of the base stations with excess capacity. The device may utilize the list of identifiers to determine when the user device relocates to a particular base station without excess capacity and therefore not included on the list of identifiers. The device may block the fixed wireless services for the user device when the user device relocates to the particular base station, may throttle traffic for the fixed wireless services provided to the user device, and/or the like. Thus, implementations described herein may conserve computing resources, networking resources, and other resources that would have otherwise been consumed by user devices inappropriately utilizing cell sites without excess capacity for fixed wireless services, handling network traffic slow down or stoppage caused by the user devices inappropriately utilizing cell sites, handling complaints associated with the network traffic slow down or stoppage, and/or the like.

FIGS. 1A-1D are diagrams of an example 100 associated with providing network-based control of fixed wireless services. As shown in FIGS. 1A-1D, example 100 includes a user device 105, multiple base stations 110 (e.g., a first base station 110-1, a second base station 110-2, and a third base station 110-3), a service capability exposure function (SCEF) 115, a device 120, and a core network with a mobility management entity device (MME) and a home subscriber server (HSS). Further details of the user device 105, the base stations 110, the SCEF 115, the device 120, the core network, the MME, and the HSS are provided elsewhere herein. In some implementations, one or more of the functions described herein as being performed by the device 120 may be performed by the SCEF 115.

As shown in FIG. 1A, and by reference number 125, the device 120 may create a list of identifiers for the base stations 110 that support a fixed wireless service for the user device 105. In some implementations, the list of identifiers includes a list of serving cell identifiers (IDs) for the base stations 110 that support the fixed wireless service for the user device 105, evolving universal terrestrial radio access network (E-UTRAN) cell global identifiers for the base stations 110 that support the fixed wireless service for the user device 105. The fixed wireless service may include an Internet data service, a data service, and/or the like provided over a wireless network, such as a fourth generation (4G) wireless network or a fifth generation (5G) wireless network. In some implementations, the device 120 identifies the base stations 110 (e.g., the first base station 110-1 and the third base station 110-3) capable of supporting the fixed wireless service for the user device 105 and determines the identifiers for the identified base stations 110. The device 120 may compile the determined identifiers into the list of identifiers for the base stations 110 that support the fixed wireless service for the user device 105. The device 120 may modify the list of identifiers to add, to the list, identifiers of the base stations 110 that support the fixed wireless service for the user device 105 and/or may remove, from the list, identifiers of the base stations 110 that no longer support the fixed wireless service for the user device 105. The device 120 may store the list of identifiers in a data structure (e.g., a database, a table, a list, and/or the like) associated with the device 120.

In some implementations, the device 120 may create and maintain a plurality of lists of identifiers for the base stations 110 that support a plurality of fixed wireless services for a plurality of user devices 105. The device 120 may store the plurality of lists of identifiers in the data structure associated with the device 120. The device 120 may modify one or more of the plurality of lists of identifiers in the manner described above.

As further shown in FIG. 1A, and by reference number 130, the device 120 may provide the list of identifiers to the SCEF 115. During on-boarding and/or provisioning of the user device 105, the device 120 may provide the list of identifiers to the SCEF 115 via a request (e.g., a monitoring and alerting (MONTE) event request). The request may include data identifying a location of the user device 105, a customer associated with wireless services at the location of the user device 105, instructions to associate the user device 105 with the list of identifiers of the base stations 110 that support the fixed wireless service at the location, and/or the like. The SCEF 115 may associate the user device 105 with the list of identifiers based on the request received from the device 120. For example, the SCEF 115 may associate the user device 105 with identifiers for the first base station 110-1 and the third base station 110-3 based on the request.

As shown in FIG. 1B, the user device 105 may power up and may provide a first attach request 135 to the first base station 110-1. The first attach request 135 may include a request for the user device 105 to attach to the first base station 110-1 so that the user device 105 may access the fixed wireless service. The first base station 110-1 may receive the first attach request 135 and may provide the first attach request 135 to the MME. The MME may determine a first identifier for the first base station 110-1 associated with the first attach request 135.

As further shown in FIG. 1B, and by reference number 140, the MME may provide, to the SCEF 115, the first identifier for the first base station 110-1 associated with the first attach request 135. The SCEF 115 may provide, to the device 120, the first identifier for the first base station 110-1 associated with the first attach request 135. The device 120 may receive the first identifier for the first base station 110-1 associated with the first attach request 135.

As further shown in FIG. 1B, and by reference number 145, the device 120 may determine that the first identifier is included in the list of identifiers. In some implementations, the device 120 compares the first identifier with the identifiers included in the list of identifiers and determines that the first identifier is included in the list of identifiers based on the comparison. Thus, the first base station 110-1 is approved to provide the fixed wireless service to the user device 105.

As further shown in FIG. 1B, and by reference number 150, the device 120 may enable the fixed wireless service for the first base station 110-1 for the user device 105 since the first identifier is included in the list of identifiers. For example, the device 120 may provide, to the SCEF 115, an instruction indicating that the first base station 110-1 is approved to provide the fixed wireless service for the user device 105. The SCEF 115 may forward the instruction to the first base station 110-1, via the HSS and/or the MME. The first base station 110-1 may receive the instruction and may enable the fixed wireless service for the user device 105 based on the instruction.

Figure 1C:
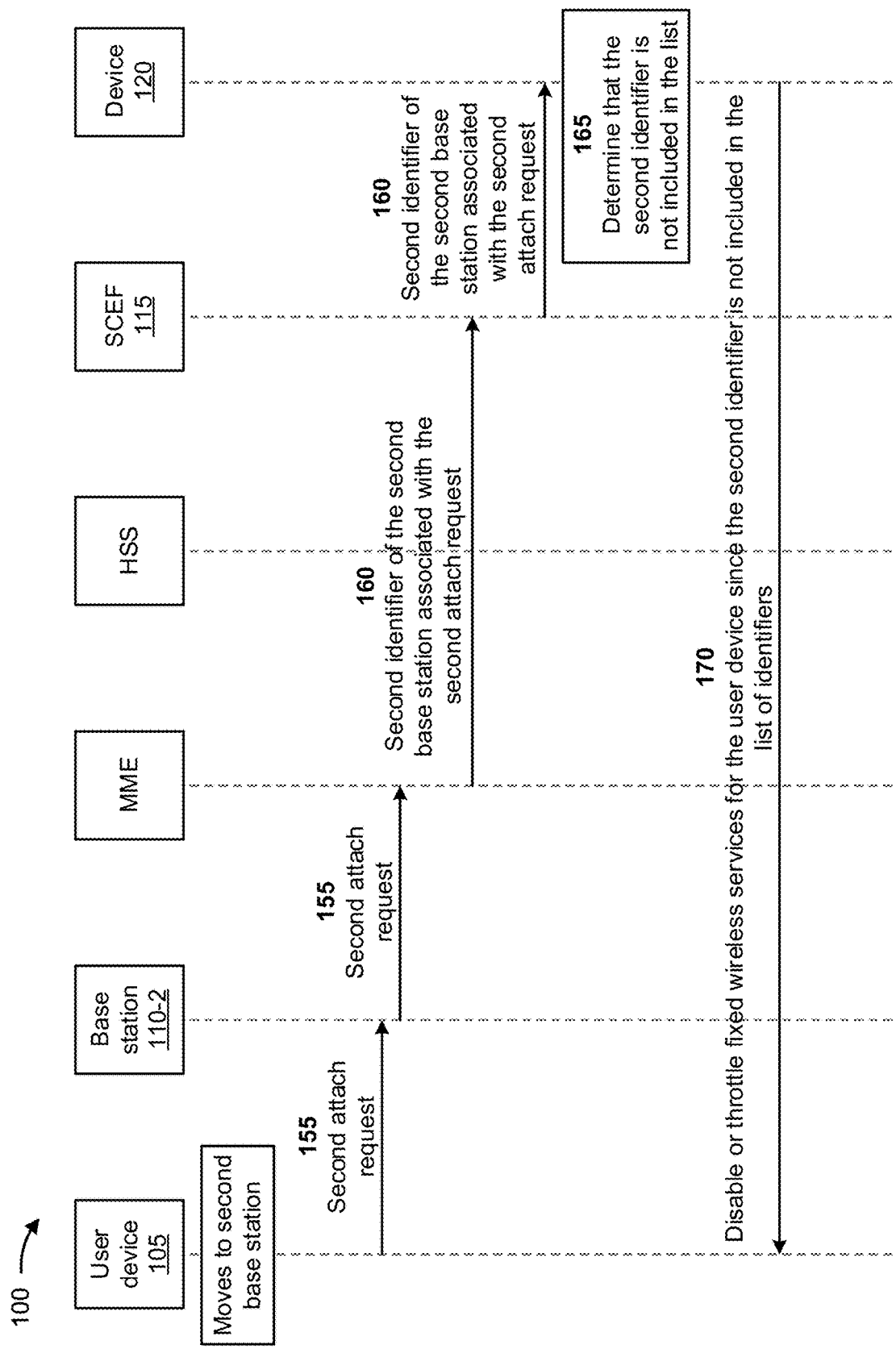

As shown in FIG. 1C, the user device 105 may move to a geographical location associated with the second base station 110-2. The geographical location of the second base station 110-2 may be different than a geographical location of the first base station 110-1. Furthermore, the second base station 110-2 may not be included in the list of identifiers. The user device 105 may provide a second attach request 155 to the second base station 110-2. The second attach request 155 may include a request for the user device 105 to attach to the second base station 110-2 so that the user device 105 may access the fixed wireless service. The second base station 110-2 may receive the second attach request 155 and may provide the second attach request 155 to the MME. The MME may determine a second identifier for the second base station 110-2 associated with the second attach request 155.

As further shown in FIG. 1C, and by reference number 160, the MME may provide, to the SCEF 115, the second identifier for the second base station 110-2 associated with the second attach request 155. The SCEF 115 may provide, to the device 120, the second identifier for the second base station 110-2 associated with the second attach request 155. The device 120 may receive the second identifier for the second base station 110-2 associated with the second attach request 155.

As further shown in FIG. 1C, and by reference number 165, the device 120 may determine that the second identifier is not included in the list of identifiers. In some implementations, the device 120 compares the second identifier with the identifiers included in the list of identifiers and determines that the second identifier is not included in the list of identifiers based on the comparison. Thus, the second base station 110-2 is not approved to provide the fixed wireless service to the user device 105.

As further shown in FIG. 1C, and by reference number 170, the device 120 may disable or throttle the fixed wireless service for the second base station 110-2 for the user device 105 since the second identifier is not included in the list of identifiers. For example, the device 120 may provide, to the SCEF 115, an instruction indicating that the second base station 110-2 is not approved to provide the fixed wireless service for the user device 105. The SCEF 115 may forward the instruction to the second base station 110-2, via the HSS and/or the MME. The second base station 110-2 may receive the instruction and may disable or throttle the fixed wireless service for the user device 105 based on the instruction.

Alternatively, or additionally, the device 120 may suspend the fixed wireless service for the second base station 110-2 for the user device 105 based on the second identifier not being included in the list of identifiers; may provide, to the user device 105, a notification instructing the user device 105 to move to a base station 110 included on the list of identifiers; may provide, to the user device 105, an indication that additional charges will be incurred if the user device 105 remains attached to the second base station 110-2, and/or the like.

Figure 1D:
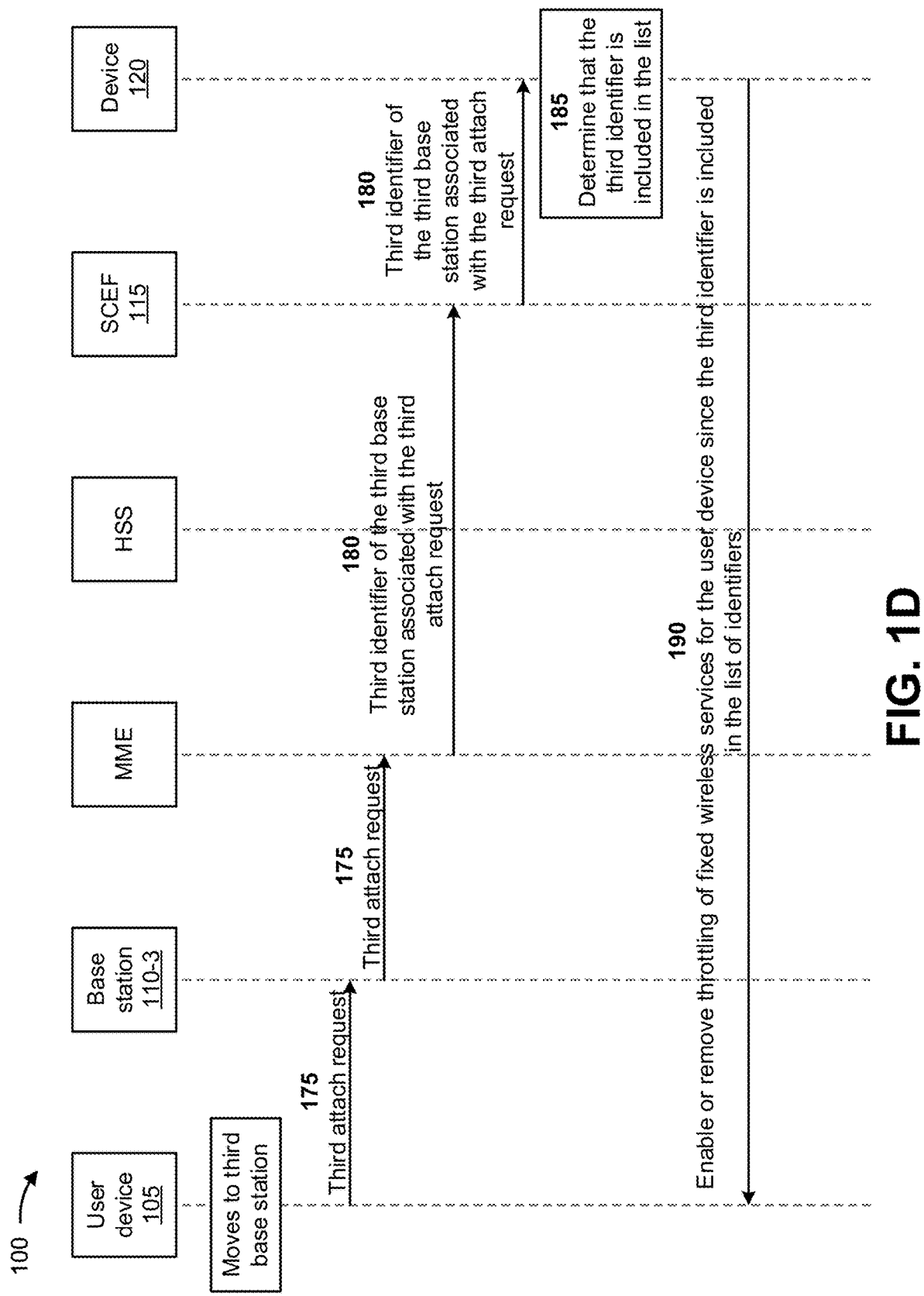

As shown in FIG. 1D, the user device 105 may move to a geographical location associated with the third base station 110-3. The geographical location of the third base station 110-3 may be different than geographical locations of the first base station 110-1 and the second base station 110-2. Furthermore, the third base station 110-3 may be included in the list of identifiers. The user device 105 may provide a third attach request 175 to the third base station 110-3. The third attach request 175 may include a request for the user device 105 to attach to the third base station 110-3 so that the user device 105 may access the fixed wireless service. The third base station 110-3 may receive the third attach request 175 and may provide the third attach request 175 to the MME. The MME may determine a third identifier for the third base station 110-3 associated with the third attach request 175.

As further shown in FIG. 1D, and by reference number 180, the MME may provide, to the SCEF 115, the third identifier for the third base station 110-3 associated with the third attach request 175. The SCEF 115 may provide, to the device 120, the third identifier for the third base station 110-3 associated with the third attach request 175. The device 120 may receive the third identifier for the third base station 110-3 associated with the third attach request 175.

As further shown in FIG. 1D, and by reference number 185, the device 120 may determine that the third identifier is included in the list of identifiers. In some implementations, the device 120 compares the third identifier with the identifiers included in the list of identifiers and determines that the third identifier is included in the list of identifiers based on the comparison. Thus, the third base station 110-3 is approved to provide the fixed wireless service to the user device 105.

As further shown in FIG. 1D, and by reference number 190, the device 120 may enable or remove throttling of the fixed wireless service for the third base station 110-3 for the user device 105 since the third identifier is included in the list of identifiers. For example, the device 120 may provide, to the SCEF 115, an instruction indicating that the third base station 110-3 is approved to provide the fixed wireless service for the user device 105. The SCEF 115 may forward the instruction to the third base station 110-3, via the HSS and/or the MME. The third base station 110-3 may receive the instruction and may enable or remove throttling of the fixed wireless service for the user device 105 based on the instruction.

In this way, the device 120 provides network-based control of fixed wireless services. For example, the device 120 may identify base stations 110 with excess capacity that are capable of serving the user device 105 for fixed wireless services and may create a list of identifiers of the base stations 110 with excess capacity. The device 120 may utilize the list of identifiers to determine when the user device 105 relocates to a particular base station 110 without excess capacity and therefore not included on the list of identifiers. The device 120 may block the fixed wireless services for the user device 105 when the user device 105 relocates to the particular base station 110, may throttle traffic for the fixed wireless services provided to the user device 105, and/or the like. Thus, implementations described herein may conserve computing resources, networking resources, and other resources that would have otherwise been consumed by user devices 105 inappropriately utilizing cell sites without excess capacity for fixed wireless services, handling network traffic slow down or stoppage caused by the user devices 105 inappropriately utilizing cell sites, handling complaints associated with the network traffic slow down or stoppage, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
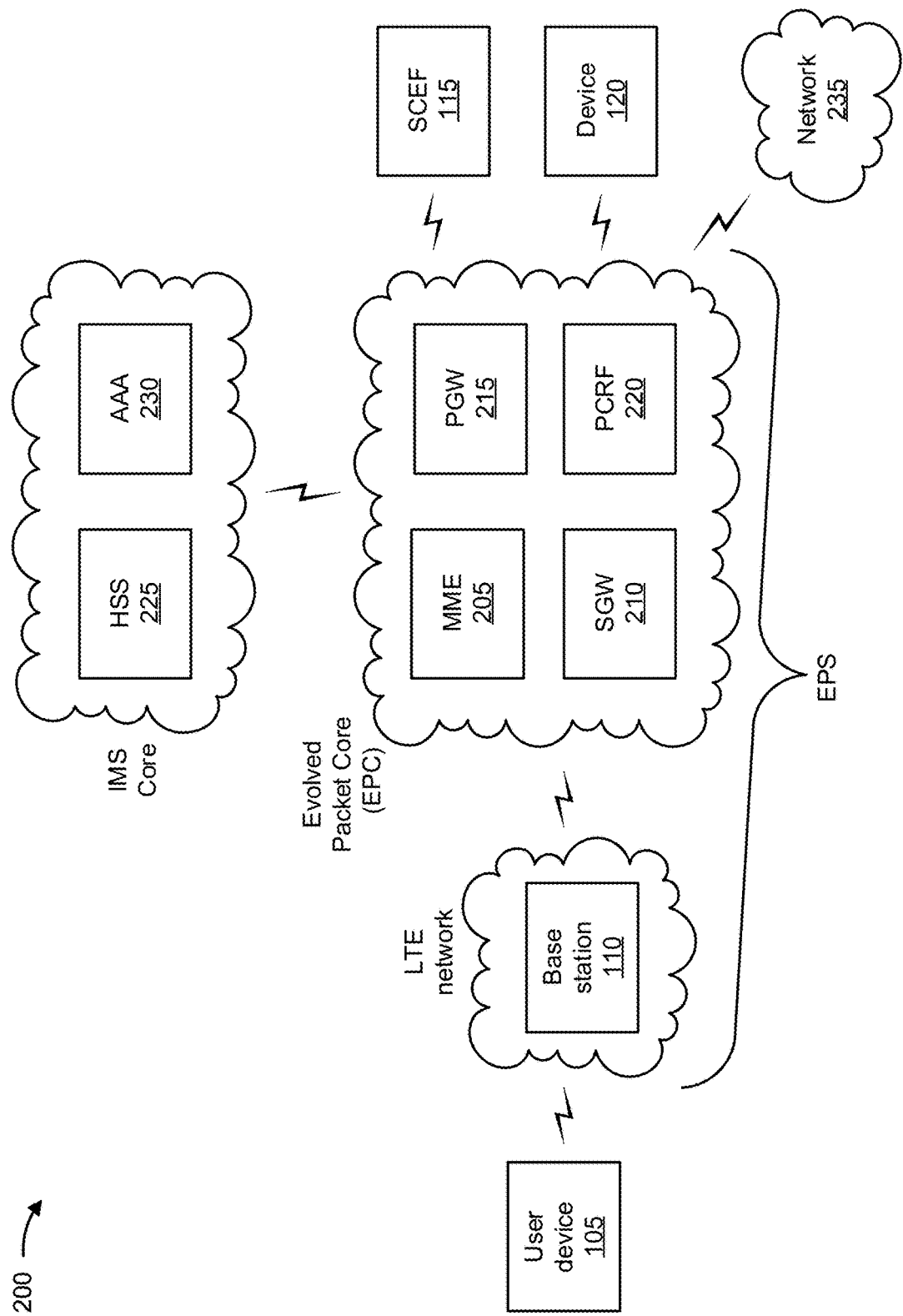
FIG. 2 is a diagram of an example environment in which systems and/or methods described herein may be implemented.

FIG. 2 is a diagram of an example environment 200 in which systems and/or methods, described herein, may be implemented. As shown in FIG. 2, the environment 200 may include the user device 105, the base station 110, the SCEF 115, the device 120, an MME 205, a serving gateway (SGW) 210, a packet data network gateway (PGW) 215, a policy and charging rules function (PCRF) 220, an HSS 225, an authentication, authorization, and accounting server (AAA) 230, and a network 235. Devices of the environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a fifth generation (5G) network.

The environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 110 that take the form of evolved Node Bs (eNBs) via which the user device 105 communicates with the EPC. The EPC may include the MME 205, the SGW 210, and/or the PGW 215 to enable the user device 105, the SCEF 115, and/or the device 120 to communicate with the network 235 and/or an Internet protocol (IP) multimedia subsystem (IMS) core. The IMS core may include the HSS 225 and/or the AAA 230, and may manage device registration and authentication, session initiation, and/or other operations associated with the user device 105. The HSS 225 and/or the AAA 230 may reside in the EPC and/or the IMS core.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an LTE to WiFi router, a modem, a jetpack, a hotspot, a device that utilizes at least one of the network components in an attach and reporting process, or a similar type of device.

The base station 110 includes one or more devices capable of transferring traffic, such as audio, video, text, and/or other traffic, destined for and/or received from the user device 105. In some implementations, the base station 110 may include an eNB associated with the LTE network that receives traffic from and/or sends traffic to the network 235 via the SGW 210 and/or the PGW 215. Additionally, or alternatively, one or more base stations 110 may be associated with a RAN that is not associated with the LTE network. The base station 110 may send traffic to and/or receive traffic from the user device 105 via an air interface. In some implementations, the base station 110 may include a small cell base station, such as a base station of a microcell, a picocell, or a femtocell.

The SCEF 115 includes one or more network exposure devices, such as one or more server devices, capable of exposing capabilities, events, information, and/or the like in one or more wireless networks to help other devices in the one or more wireless networks discover network services and/or utilize network resources efficiently. In some implementations, the SCEF 115 may be associated with a 5G network that receives traffic from and/or sends traffic to a user device 105 via the base station 110, and that receives traffic from and/or sends traffic to the device 120. In some implementations, the SCEF 115 may be associated with an L network that receives traffic from and/or sends traffic to the user device 105 via the MME 205 and the base station 110, and that receives traffic from and/or sends traffic to the device 120. In some implementations, the SCEF 115 may determine a location and/or reachability of the user device 105 and/or a communication capability of the base station 110.

The device 120 includes one or more devices capable of receiving, generating, storing, processing, providing, and/or routing information, as described elsewhere herein. The device 120 may include a communication device and/or a computing device. For example, the device 120 may include a network device, a server, such as an application server, a client server, a web server, a database server, a host server, a proxy server, a virtual server (e.g., executing on computing hardware), or a server in a cloud computing system. In some implementations, the device 120 includes computing hardware used in a cloud computing environment.

The MME 205 includes one or more devices, such as one or more server devices, capable of managing authentication, activation, deactivation, and/or mobility functions associated with the user device 105. In some implementations, the MME 205 may perform operations relating to authentication of the user device 105. Additionally, or alternatively, the MME 205 may facilitate the selection of a particular SGW 210 and/or a particular PGW 215 to provide traffic to and/or from the user device 105. The MME 205 may perform operations associated with handing off the user device 105 from a first base station 110 to a second base station 110 when the user device 105 is transitioning from a first cell associated with the first base station 110 to a second cell associated with the second base station 110. Additionally, or alternatively, the MME 205 may select another MME (not shown), to which the user device 105 should be handed off (e.g., when the user device 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 210 may aggregate traffic received from one or more base stations 110 associated with the LTE network, and may send the aggregated traffic to the network 235 (e.g., via the PGW 215) and/or other network devices associated with the EPC and/or the IMS core. The SGW 210 may receive traffic from the network 235 and/or other network devices, and may send the received traffic to the user device 105 via the base station 110. Additionally, or alternatively, the SGW 210 may perform operations associated with handing off the user device 105 to and/or from an LTE network.

The PGW 215 includes one or more devices capable of providing connectivity for user device 105 to external packet data networks (e.g., other than the depicted EPC and/or LTE network). For example, the PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 215 may aggregate traffic received from one or more the SGWs 210, and may send the aggregated traffic to the network 235. Additionally, or alternatively, the PGW 215 may receive traffic from the network 235, and may send the traffic to the user device 105 via the SGW 210 and the base station 110. The PGW 215 may record data usage information (e.g., byte usage), and may provide the data usage information to the AAA 230.

The PCRF 220 includes one or more devices, such as one or more server devices, capable of providing policy control decision and flow-based charging control functionalities. For example, the PCRF 220 may provide network control regarding service data flow detection, gating, and/or quality of service (QoS) and flow-based charging, among other examples. In some implementations, the PCRF 220 may determine how a certain service data flow is to be treated, and may ensure that user plane traffic mapping and treatment is in accordance with a user subscription profile.

The HSS 225 includes one or more devices, such as one or more server devices, capable of managing (e.g., receiving, generating, storing, processing, and/or providing) information associated with the user device 105. For example, the HSS 225 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 225 may provide this information to one or more other devices of the environment 200 to support the operations performed by those devices.

The AAA 230 includes one or more devices, such as one or more server devices, that perform authentication, authorization, and/or accounting operations for communication sessions associated with the user device 105. For example, the AAA 230 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 235 includes one or more wired and/or wireless networks. For example, the network 235 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
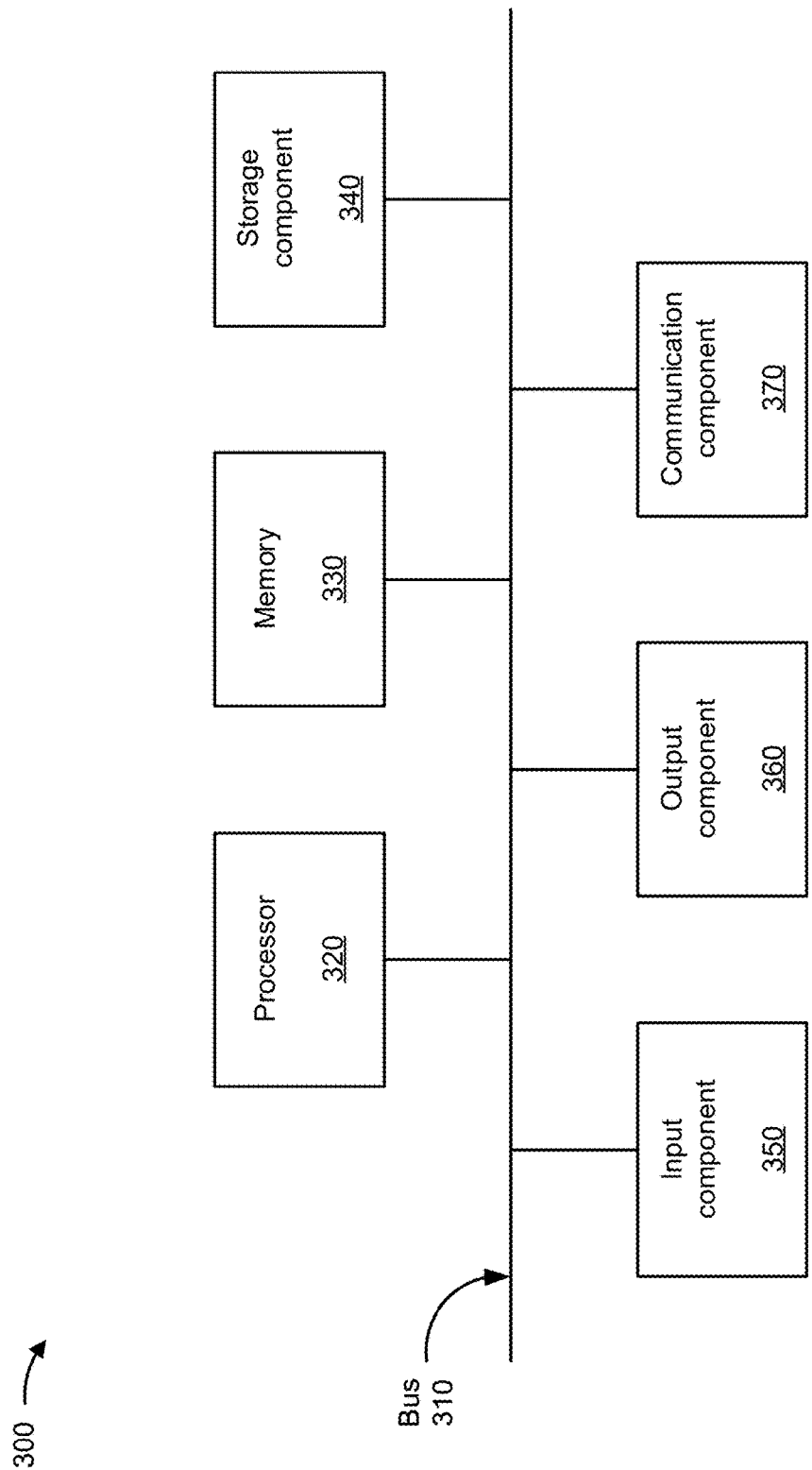
FIG. 3 is a diagram of example components of one or more devices of FIG. 2.

FIG. 3 is a diagram of example components of one or more devices of FIG. 2. The one or more devices may include a device 300, which may correspond to the user device 105, the base station 110, the SCEF 115, the device 120, the MME 205, the SGW 210, the PGW 215, the PCRF 220, the HSS 225, and/or the AAA 230. In some implementations, the user device 105, the base station 110, the SCEF 115, the device 120, the MME 205, the SGW 210, the PGW 215, the PCRF 220, the HSS 225, and/or the AAA 230 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory). The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
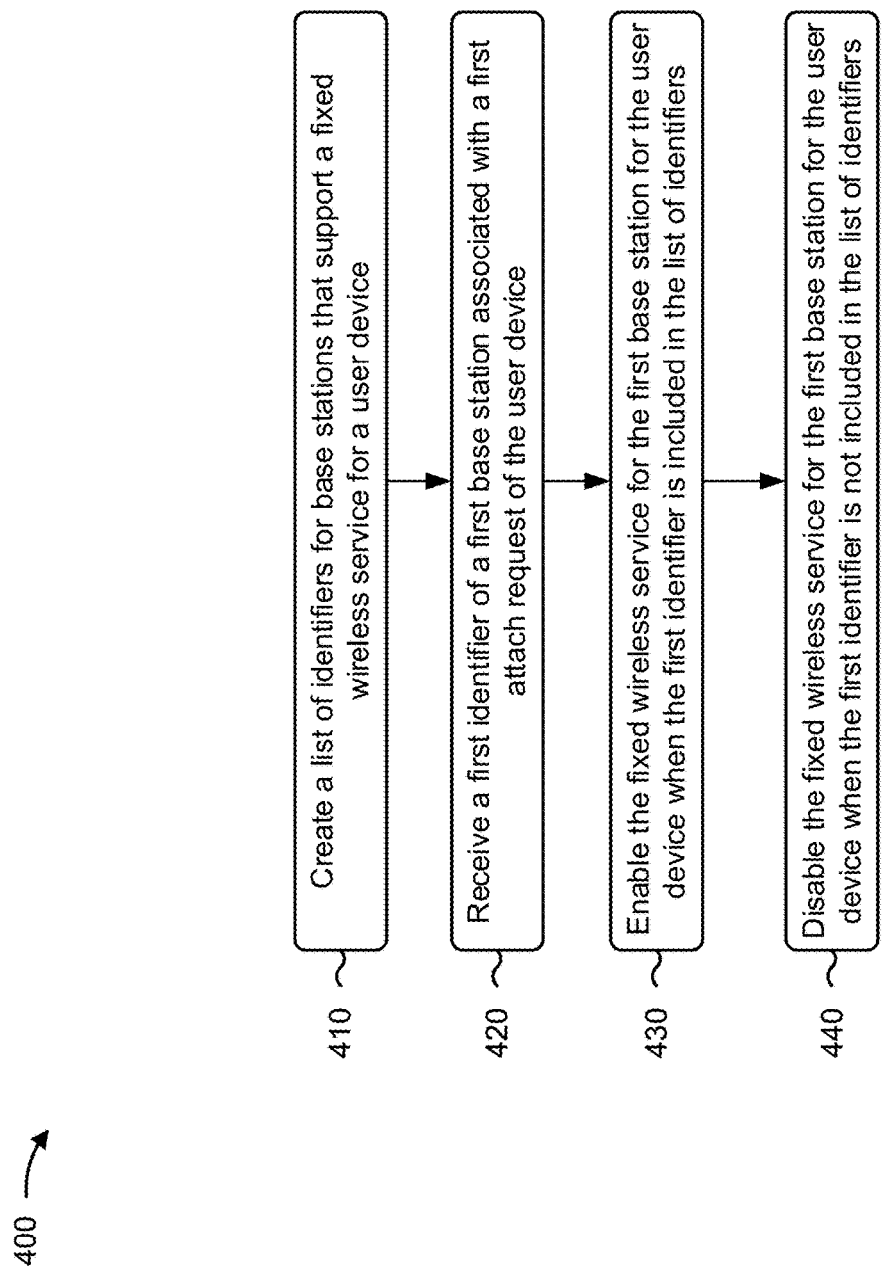
FIG. 4 is a flowchart of an example process for providing network-based control of fixed wireless services.

FIG. 4 is a flowchart of an example process 400 for providing network-based control of fixed wireless services. In some implementations, one or more process blocks of FIG. 4 may be performed by a device (e.g., the device 120). In some implementations, one or more process blocks of FIG. 4 may be performed by another device or a group of devices separate from or including the device, such as an SCEF (e.g., the SCEF 115), an MME (e.g., the MME 205), and/or an HSS (e.g., the HSS 225). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include creating a list of identifiers for base stations that support a fixed wireless service for a user device (block 410). For example, the device may create a list of identifiers for base stations that support a fixed wireless service for a user device, as described above. In some implementations, the list of identifiers includes a list of one or more of: serving cell identifiers for the base stations that support the fixed wireless service for the user device, or evolving universal terrestrial radio access network cell global identifiers for the base stations that support the fixed wireless service for the user device. In some implementations, the fixed wireless service includes an Internet data service. In some implementations, the fixed wireless service includes a combination of a fourth generation and a fifth generation fixed wireless service.

As further shown in FIG. 4, process 400 may include receiving a first identifier of a first base station associated with a first attach request of the user device (block 420). For example, the device may receive a first identifier of a first base station associated with a first attach request of the user device, as described above. In some implementations, receiving the first identifier of the first base station associated with the first attach request of the user device includes receiving the first identifier of the first base station from a service capability exposure function device and via a mobility management entity device.

As further shown in FIG. 4, process 400 may include enabling the fixed wireless service for the first base station for the user device when the first identifier is included in the list of identifiers (block 430). For example, the device may enable the fixed wireless service for the first base station for the user device when the first identifier is included in the list of identifiers, as described above.

As further shown in FIG. 4, process 400 may include disabling the fixed wireless service for the first base station for the user device when the first identifier is not included in the list of identifiers (block 440). For example, the device may disable the fixed wireless service for the first base station for the user device when the first identifier is not included in the list of identifiers, as described above.

In some implementations, process 400 includes providing the list of identifiers to a service capability exposure function device that enables the user device to discover network services and utilize network resources.

In some implementations, process 400 includes receiving a second identifier of a second base station associated with a second attach request of the user device, wherein the second identifier is different than the first identifier; and disabling or throttling the fixed wireless service for the second base station for the user device when the second identifier is not included in the list of identifiers. In some implementations, receiving the second identifier of the second base station associated with the second attach request of the user device includes receiving the second identifier of the second base station from a service capability exposure function device and via a mobility management entity device.

In some implementations, process 400 includes one or more of suspending the fixed wireless service for the second base station for the user device when the second identifier is not included in the list of identifiers; providing, to the user device, a notification instructing the user device to move to a base station included on the list of identifiers; or providing, to the user device, an indication that additional charges will be incurred if the user device remains attached to the second base station.

In some implementations, process 400 includes receiving a third identifier of a third base station associated with a third attach request of the user device, wherein the third identifier is different than the first identifier and the second identifier; and enabling or removing the throttling of the fixed wireless service for the third base station for the user device when the third identifier is included in the list of identifiers. In some implementations, receiving the third identifier of the third base station associated with the third attach request of the user device includes receiving the third identifier of the third base station from a service capability exposure function device and via a mobility management entity device.

In some implementations, process 400 includes maintaining a data structure that stores a plurality of lists of identifiers for base stations that support a plurality of fixed wireless services for a plurality of user devices. In some implementations, process 400 includes providing the plurality of lists of identifiers to a service capability exposure function device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying, by a server device configured to provide network-based control of wireless services, base stations with excess capacity that are capable of serving a user device for a fixed wireless service;

creating, by the server device, a list of identifiers for the base stations that support the fixed wireless service for the user device;

receiving, by the server device, a first identifier of a first base station associated with a first attach request of the user device;

transmitting, by the server device, a message indicating that the first base station is authorized to provide the fixed wireless service for the user device when the first identifier is included in the list of identifiers;

transmitting, by the server device, a message indicating that the first base station is not authorized to provide the fixed wireless service for the user device when the first identifier is not included in the list of identifiers; and providing, by the server device, a notification instructing the user device to connect to a base station included on the list of identifiers when the first identifier is not included in the list of identifiers.

2. The method of claim 1, further comprising:
providing the list of identifiers to a service capability exposure function (SCEF) device that enables the user device to discover network services and utilize network resources, wherein transmitting the message indicating that the first base station is authorized to provide the fixed wireless service comprises:
transmitting, to the SCEF, the message indicating that the first base station is authorized to provide the fixed wireless service for the user device when the first identifier is included in the list of identifiers; and wherein transmitting the message indicating that the first base station is not authorized to provide the fixed wireless service comprises:
transmitting, to the SCEF, the message indicating that the first base station is not authorized to provide the fixed wireless service for the user device when the first identifier is not included in the list of identifiers.

3. The method of claim 1, further comprising:
receiving a second identifier of a second base station associated with a second attach request of the user device,
wherein the second identifier is different than the first identifier; and
disabling or throttling the fixed wireless service for the second base station for the user device when the second identifier is not included in the list of identifiers.

4. The method of claim 3, wherein receiving the second identifier of the second base station associated with the second attach request of the user device comprises:
receiving the second identifier of the second base station from a service capability exposure function device and via a mobility management entity device.

5. The method of claim 1, wherein the first identifier is not included in the list of identifiers, the method further comprising:
providing, to the user device, an indication that additional charges will be incurred if the user device remains attached to the first base station.

6. The method of claim 3, further comprising:
receiving a third identifier of a third base station associated with a third attach request of the user device,
wherein the third identifier is different than the first identifier and the second identifier; and
enabling or removing the throttling of the fixed wireless service for the third base station for the user device when the third identifier is included in the list of identifiers.

7. The method of claim 6, wherein receiving the third identifier of the third base station associated with the third attach request of the user device comprises:
receiving the third identifier of the third base station from a service capability exposure function device and via a mobility management entity device.

8. A server device, comprising:
one or more processors configured to:
provide network-based control of wireless services, wherein the one or more processors, to provide the network-based control of the wireless services, are configured to:
identify base stations with excess capacity that are capable of serving a user device for a fixed wireless service;
create a list of identifiers for the base stations that support the fixed wireless service for the user device;
receive a first identifier of a first base station associated with a first attach request of the user device;
transmit a message indicating that the first base station is authorized to provide the fixed wireless service for the user device when the first identifier is included in the list of identifiers;
transmit a message indicating that the first base station is not authorized to provide the fixed wireless service is throttled for the user device when the first identifier is not included in the list of identifiers; and
provide a notification instructing the user device to connect to a base station included on the list of identifiers when the first identifier is not included in the list of identifiers.

9. The server device of claim 8, wherein the list of identifiers includes a list of one or more of:
serving cell identifiers for the base stations that support the fixed wireless service for the user device, or
evolve universal terrestrial radio access network cell global identifiers for the base stations that support the fixed wireless service for the user device.

10. The server device of claim 8, wherein the one or more processors, to receive the first identifier of the first base station associated with the first attach request of the user device, are configured to:
receive the first identifier of the first base station from a service capability exposure function device and via a mobility management entity device.

11. The server device of claim 8, wherein the device comprises a service capability exposure function device.

12. The server device of claim 8, wherein the fixed wireless service includes a combination of a fourth generation fixed wireless service and a fifth generation fixed wireless service.

13. The server device of claim 8, wherein the one or more processors are further configured to:
maintain a data structure that stores a plurality of lists of identifiers for base stations that support a plurality of fixed wireless services for a plurality of user devices.

14. The server device of claim 13, wherein the one or more processors are further configured to:
provide the plurality of lists of identifiers to a service capability exposure function device.

15. A non-transitory computer-readable medium storing a set of instructions, the set of instructions comprising:
one or more instructions that, when executed by one or more processors of a server device, cause the server device to:
provide network-based control of wireless services, wherein the one or more instructions that cause the server device to provide the network-based control of the wireless services, cause the server device to:
identify base stations with excess capacity that are capable of serving a user device for a fixed wireless service;
create a list of identifiers for the base stations that support the fixed wireless service for the user device;
receive a first identifier of a first base station associated with a first attach request of the user device;
transmit a message indicating that the first base station is authorized to provide the fixed wireless service for the user device based on the first identifier being included in the list of identifiers;
receive a second identifier of a second base station associated with a second attach request of the user device,
wherein the second identifier is different than the first identifier;
transmit a message indicating that the second base station is not authorized to provide the fixed wireless service for the user device based on the second identifier not being included in the list of identifiers; and
provide a notification instructing the user device to connect to a base station included on the list of identifiers based on the second identifier not being included in the list of identifiers.

16. The non-transitory computer-readable medium of claim 15, wherein the one or more instructions further cause the server device to:
provide, to the user device, an indication that additional charges will be incurred if the user device remains attached to the second base station.

17. The non-transitory computer-readable medium of claim 15, wherein the one or more instructions further cause the server device to:
receive a third identifier of a third base station associated with a third attach request of the user device,
wherein the third identifier is different than the first identifier and the second identifier;
determine that the third identifier is included in the list of identifiers; and
enable the fixed wireless service for the third base station for the user device based on the third identifier being included in the list of identifiers.

18. The non-transitory computer-readable medium of claim 15, wherein the list of identifiers includes a list of one or more of:
serving cell identifiers for the base stations that support the fixed wireless service for the user device, or
evolve universal terrestrial radio access network cell global identifiers for the base stations that support the fixed wireless service for the user device.

19. The non-transitory computer-readable medium of claim 15, wherein the one or more instructions, that cause the server device to receive the first identifier of the first base station associated with the first attach request of the user device, cause the server device to:
receive the first identifier of the first base station from a service capability exposure function device and via a mobility management entity device.

20. The non-transitory computer-readable medium of claim 15, wherein the one or more instructions further cause the server device to:
maintain a data structure that stores a plurality of lists of identifiers for base stations that support a plurality of fixed wireless services for a plurality of user devices; and
provide the plurality of lists of identifiers to a service capability exposure function device.

* * * * *